(12) United States Patent
Lee et al.

(10) Patent No.: US 10,264,484 B2
(45) Date of Patent: Apr. 16, 2019

(54) METHOD FOR CALCULATING AND REPORTING AN AMOUNT OF DATA AVAILABLE FOR TRANSMISSION AND A DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 15/113,964

(22) PCT Filed: Feb. 25, 2015

(86) PCT No.: PCT/KR2015/001813
§ 371 (c)(1),
(2) Date: Jul. 25, 2016

(87) PCT Pub. No.: WO2015/137644
PCT Pub. Date: Sep. 17, 2015

(65) Prior Publication Data
US 2016/0337895 A1    Nov. 17, 2016

Related U.S. Application Data

(60) Provisional application No. 61/951,532, filed on Mar. 12, 2014.

(51) Int. Cl.
*H04W 28/02* (2009.01)
*H04L 12/861* (2013.01)
(Continued)

(52) U.S. Cl.
CPC ......... *H04W 28/0263* (2013.01); *H04L 49/90* (2013.01); *H04W 28/0205* (2013.01);
(Continued)

(58) Field of Classification Search
CPC .. H04L 49/90; H04W 28/02; H04W 28/0205; H04W 28/06; H04W 84/042; H04W 88/06
See application file for complete search history.

(56) References Cited

U.S. PATENT DOCUMENTS 9,264,930 B2 *  2/2016  Damnjanovic ... H04W 72/1252
9,883,419 B2 *  1/2018  Basu Mallick ... H04W 28/0278
(Continued)

FOREIGN PATENT DOCUMENTS

WO    2011/100492 A1    8/2011
WO    2012/040265 A1    3/2012

OTHER PUBLICATIONS

NSN, et al; "BSR and SR for Dual Connectivity"; Feb. 2014; 3GPP TSG-RAN WG2 Meeting #85; R2-140043; pp. 1-4. (Year: 2014).*
(Continued)

*Primary Examiner* — Robert C Scheibel
(74) *Attorney, Agent, or Firm* — Morgan, Lewis & Bockius LLP

(57) ABSTRACT

The present invention relates to a wireless communication system. More specifically, the present invention relates to a method and a device for calculating and reporting a data available for transmission in a PDCP entity in a dual connectivity system, the method comprising: triggering an event for reporting an amount of data available for transmission in a PDCP (Packet Data Convergence Protocol) entity, wherein the PDCP entity is mapped to two RLC (Radio Link Control) entities and two MAC (Medium Access Control); and reporting the amount of data available for transmission in the PDCP entity as zero to the first BS and the second BS.

10 Claims, 13 Drawing Sheets

(51) Int. Cl.
*H04W 76/15* (2018.01)
*H04W 28/06* (2009.01)
*H04W 88/06* (2009.01)
*H04W 84/04* (2009.01)

(52) U.S. Cl.
CPC ............ *H04W 76/15* (2018.02); *H04W 28/06* (2013.01); *H04W 84/042* (2013.01); *H04W 88/06* (2013.01)

(56) References Cited

U.S. PATENT DOCUMENTS

| | | | |
|---|---|---|---|
| 2010/0189007 A1 | 7/2010 | Chun et al. | |
| 2012/0071185 A1* | 3/2012 | Dayal | H04W 72/1215 455/509 |
| 2013/0176988 A1 | 7/2013 | Wang et al. | |
| 2013/0322331 A1* | 12/2013 | Ramkumar | H04W 28/10 370/328 |
| 2014/0247733 A1* | 9/2014 | Yang | H04W 36/14 370/252 |
| 2016/0234714 A1* | 8/2016 | Basu Mallick | H04W 28/085 |
| 2016/0286429 A1* | 9/2016 | Chen | H04W 72/1284 |

OTHER PUBLICATIONS

3GPP TS 36.323 V11.2.0 (Mar. 2013); "Packet Data Convergence Protocol (PDCP) specification (Release 11)"; Mar. 2013; pp. 1-27. (Year: 2013).*

International Search Report issued in corresponding International Patent Application No. PCT/KR2015/001813 dated May 27, 2015.

NSN, Nokia Corporation, "BSR and SR for Dual Connectivity," R2-140043, 3GPP TSG-RAN WG2 Meeting #85, Prague, Czech Republic, Feb. 14, 2014.

Panasonic, "BSR Reporting Options for Dual Connectivity," R2-140475, 3GPP TSG RAN WG2 #85, Prague, Czech Republic, Feb. 14, 2014.

* cited by examiner

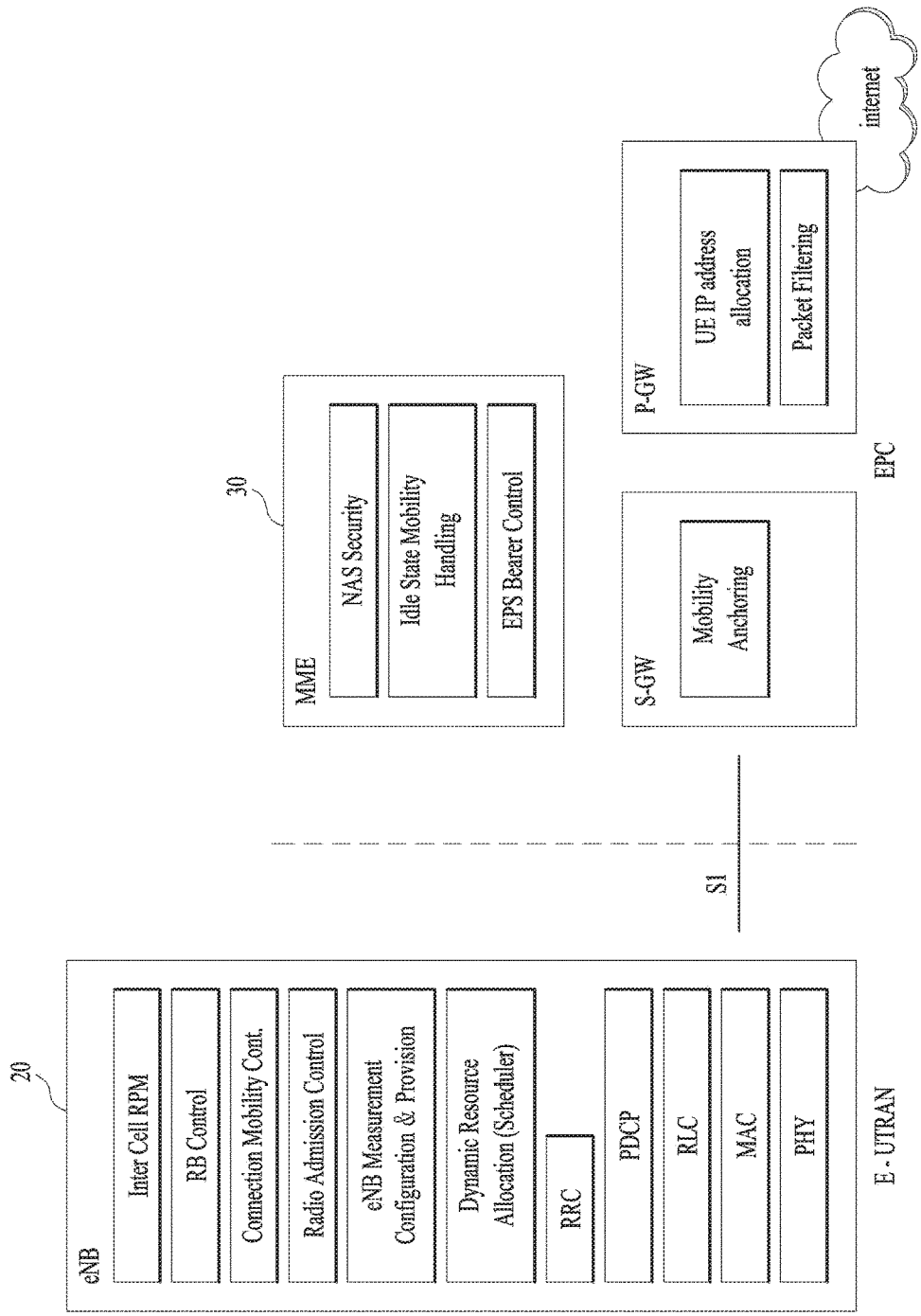

FIG. 3
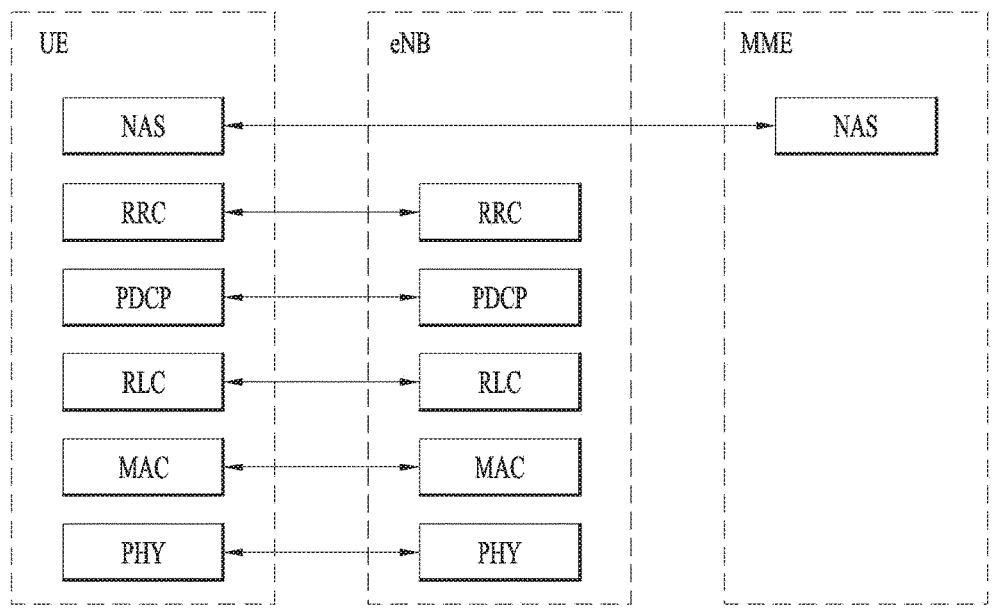
(a) Control-Plane Protocol Stack
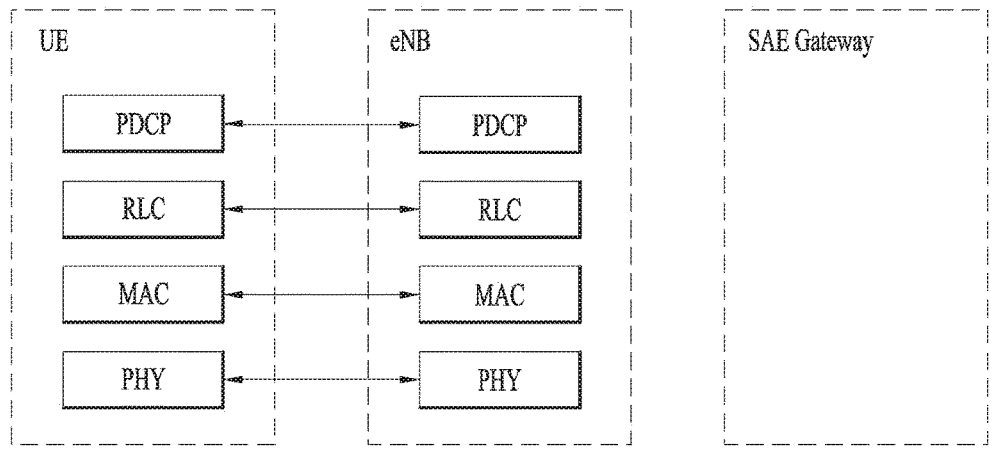
(b) User-Plane Protocol Stack (a) C-Plane connectivity of eNBs involved in dual connectivity (b) U-Plane connectivity of eNBs involved in dual connectivity

METHOD FOR CALCULATING AND REPORTING AN AMOUNT OF DATA AVAILABLE FOR TRANSMISSION AND A DEVICE THEREFOR

TECHNICAL FIELD

The present invention relates to a wireless communication system and, more particularly, to a method for calculating and reporting an amount of data available for transmission and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for calculating and reporting an amount of data available for transmission in a PDCP entity. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: triggering an event for reporting an amount of data available for transmission in a PDCP (Packet Data Convergence Protocol) entity, wherein the PDCP entity is mapped to two RLC (Radio Link Control) entities and two MAC (Medium Access Control); and reporting the amount of data available for transmission in the PDCP entity as zero to the first BS and the second BS.

In another aspect of the present invention, provided herein is a UE (User Equipment) for re-ordering a PDCP PDU in a wireless communication system, the UE comprising: an RF (Radio Frequency) module; and a processor configured to control the RF module, wherein the processor is configured to trigger an event for reporting an amount of data available for transmission in a PDCP (Packet Data Convergence Protocol) entity, wherein the PDCP entity is mapped to two RLC (Radio Link Control) entities and two MAC (Medium Access Control), and to report the amount of data available for transmission in the PDCP entity as zero to the first BS and the second BS.

Preferably, the triggering the event comprising at least one receiving data from an upper layer of a PDCP entity or generating data in the PDCP entity.

Preferably, the amount of data available for transmission in the PDCP entity comprises data received from the upper layer of a PDCP entity and data generated in the PDCP entity.

Preferably, the method further comprises: indicating, by the PDCP entity to each MAC entity, that the amount of data available for transmission in the PDCP entity is zero.

Preferably, calculating, by a MAC entity, a buffer size without considering the amount of data available for transmission in the PDCP entity when the BSR MAC CE is generated for the MAC entity.

It is to be understood that both the foregoing general description and the following detailed description of the present invention are exemplary and explanatory and are intended to provide further explanation of the invention as claimed.

Advantageous Effects

According to the present invention, calculating and reporting amount of data available for transmission can be efficiently performed in a dual connectivity system. Specifically, the UE can calculate and report each amount of data available for transmission to each base station in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
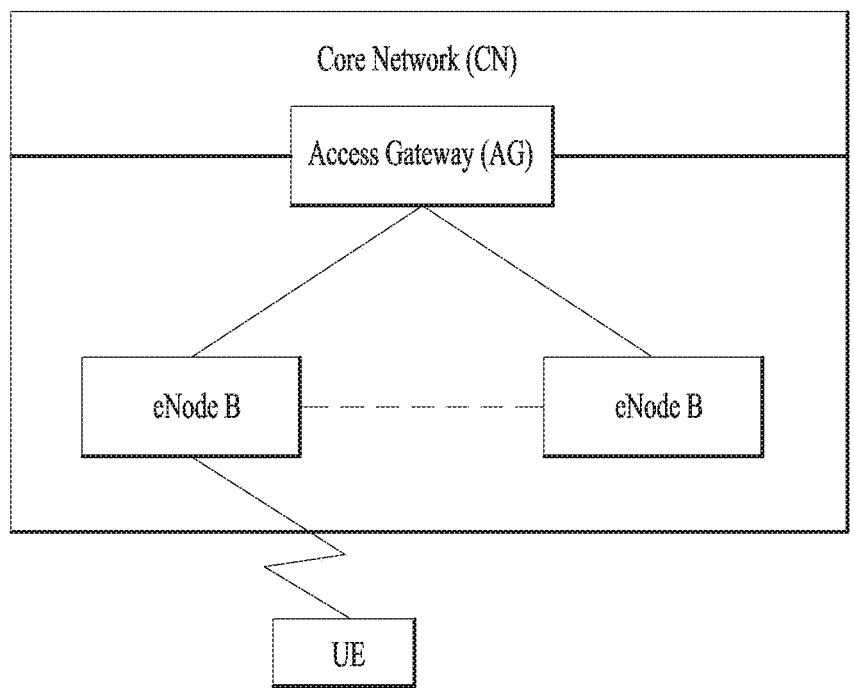
FIG. 1 is a diagram showing a network structure of an Evolved Universal Mobile Telecommunications System (E-UMTS) as an example of a wireless communication system.
Figure 2A:
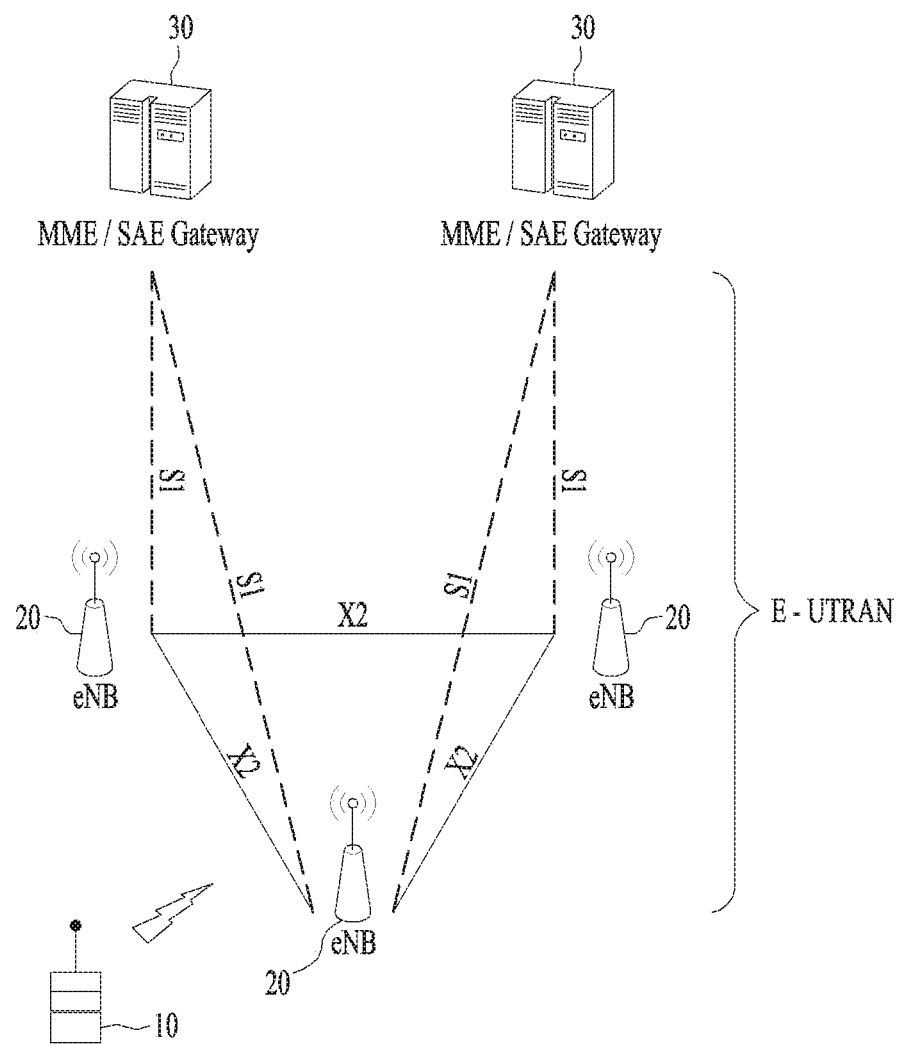
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
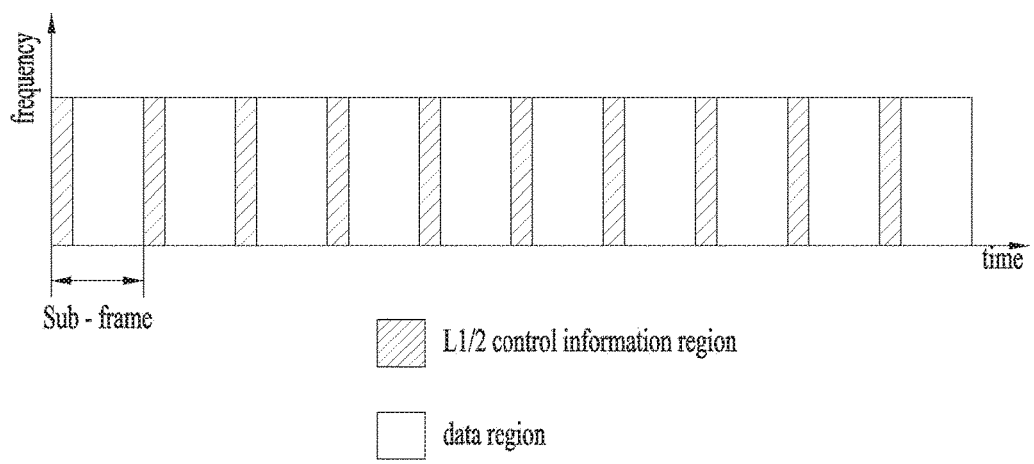
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
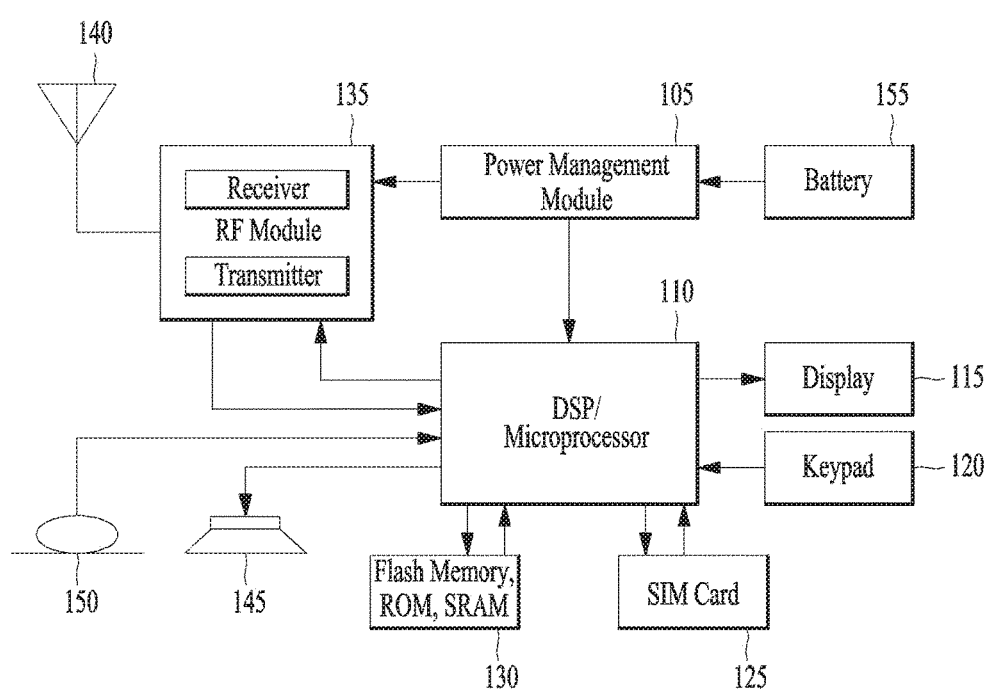
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receivers and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
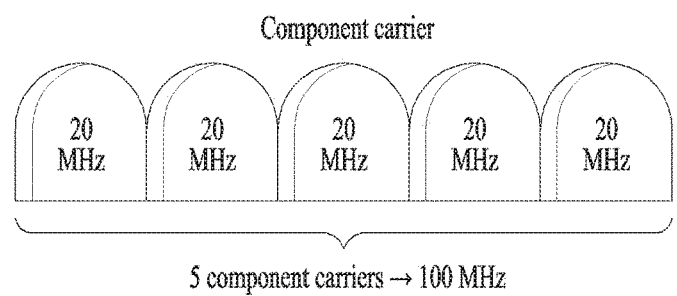
FIG. 6 is a diagram for carrier aggregation.

FIG. 6 is a diagram for carrier aggregation.

Carrier aggregation technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
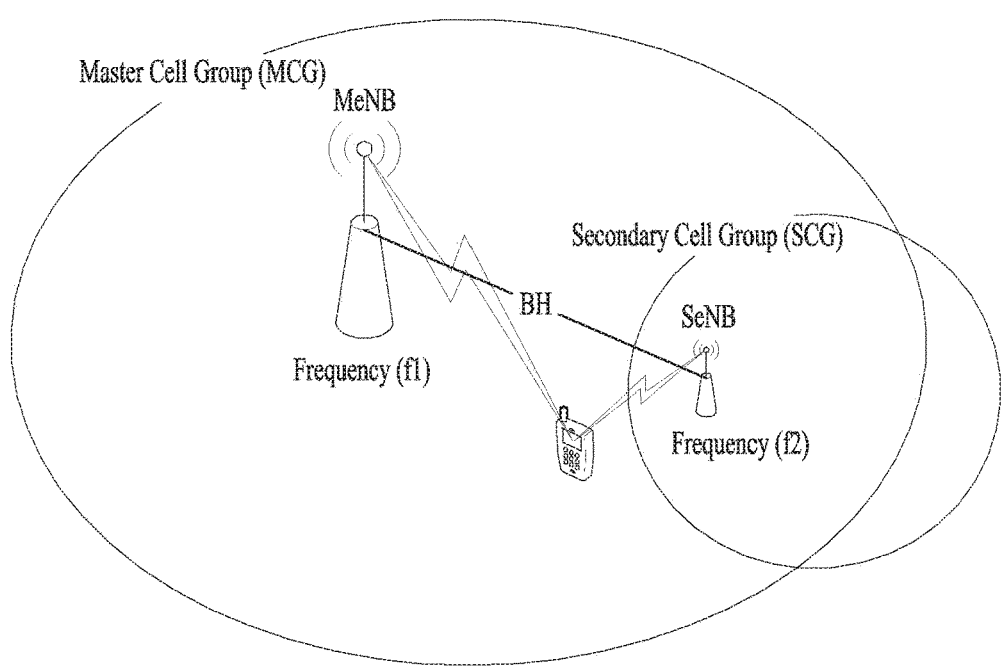
FIG. 7 is a conceptual diagram for dual connectivity between a Master Cell Group (MCG) and a Secondary Cell Group (SCG)

FIG. 7 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

Figure 10:
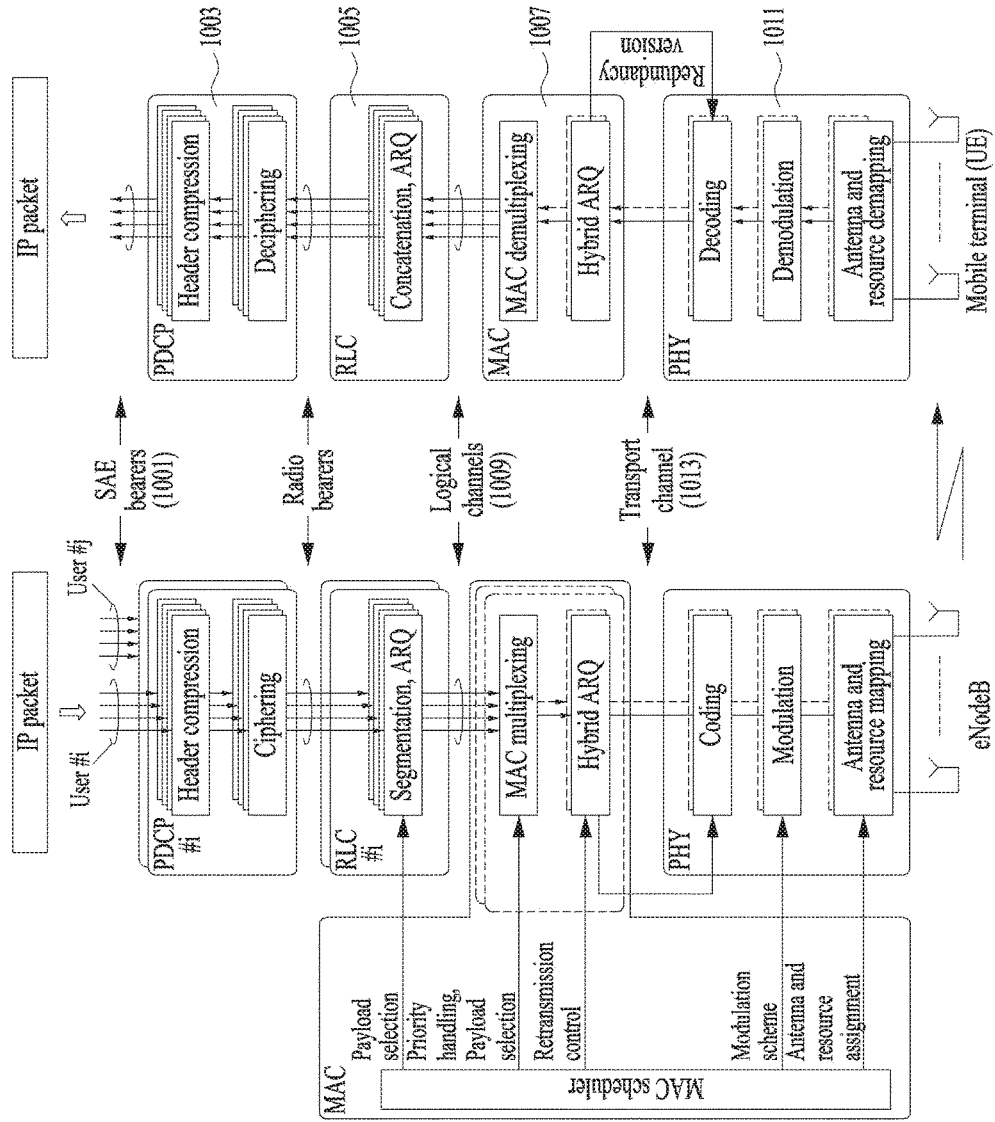
FIG. 10 is a diagram for a general overview of the LTE protocol architecture for the downlink.

The dual connectivity is a kind of carrier aggregation in that the UE is configured a plurality serving cells. However, unlike all serving cells supporting carrier aggregation of FIG. 8 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 8A:
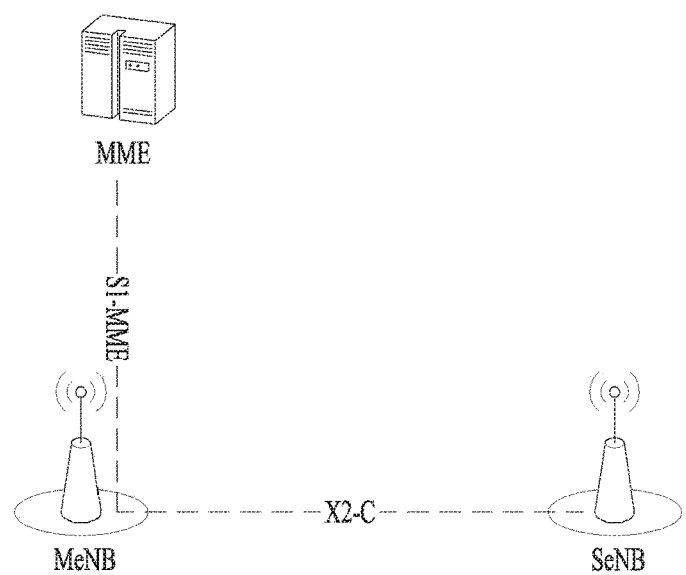
FIG. 8a is a conceptual diagram for C-Plane connectivity of base stations involved in dual connectivity.

FIG. 8a shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 8B:
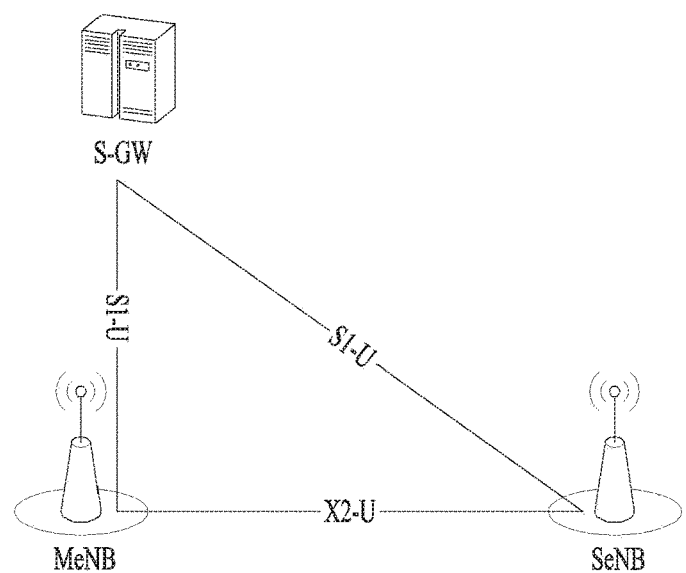
FIG. 8b is a conceptual diagram for U-Plane connectivity of base stations involved in dual connectivity.

FIG. 8b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 9:
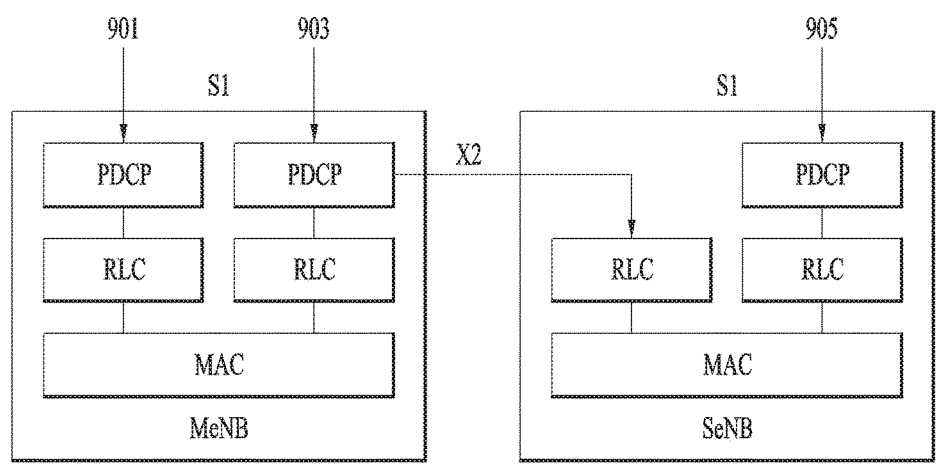
FIG. 9 is a conceptual diagram for radio protocol architecture for dual connectivity.

FIG. 9 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (901), split bearer (903) and SCG bearer (905). Those three alternatives are depicted on FIG. 9. The SRBs (Signaling Radio Bearers) are always of the MCG bearer and therefore only use the radio resources provided by the MeNB. The MCG bearer (901) is a radio protocol only located in the MeNB to use MeNB resources only in the dual connectivity. And the SCG bearer (905) is a radio protocol only located in the SeNB to use SeNB resources in the dual connectivity.

Specially, the split bearer (903) is a radio protocol located in both the MeNB and the SeNB to use both MeNB and SeNB resources in the dual connectivity and the split bearer (903) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (903) are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (903) are: i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

In Dual Connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

The functions of the different MAC entities in the UE operate independently if not otherwise indicated. The timers and parameters used in each MAC entity are configured independently if not otherwise indicated. The Serving Cells, C-RNTI, radio bearers, logical channels, upper and lower layer entities, LCGs, and HARQ entities considered by each MAC entity refer to those mapped to that MAC entity if not otherwise indicated FIG. 10 is a diagram for a general overview of the LTE protocol architecture for the downlink.

A general overview of the LTE protocol architecture for the downlink is illustrated in FIG. 10. Furthermore, the LTE protocol structure related to uplink transmissions is similar to the downlink structure in FIG. 10, although there are differences with respect to transport format selection and multi-antenna transmission.

Data to be transmitted in the downlink enters in the form of IP packets on one of the SAE bearers (1001). Prior to transmission over the radio interface, incoming IP packets are passed through multiple protocol entities, summarized below and described in more detail in the following sections:

Packet Data Convergence Protocol (PDCP, 1003) performs IP header compression to reduce the number of bits necessary to transmit over the radio interface. The header-compression mechanism is based on ROHC, a standardized header-compression algorithm used in WCDMA as well as several other mobile-communication standards. PDCP (1003) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 1005) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1005) offers services to the PDCP (1003) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1007) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1007) offers services to the RLC (1005) in the form of logical channels (1009).

Physical Layer (PHY, 1011), handles coding/decoding, modulation/demodulation, multi-antenna mapping, and other typical physical layer functions. The physical layer (1011) offers services to the MAC layer (1007) in the form of transport channels (1013).

Figure 11:
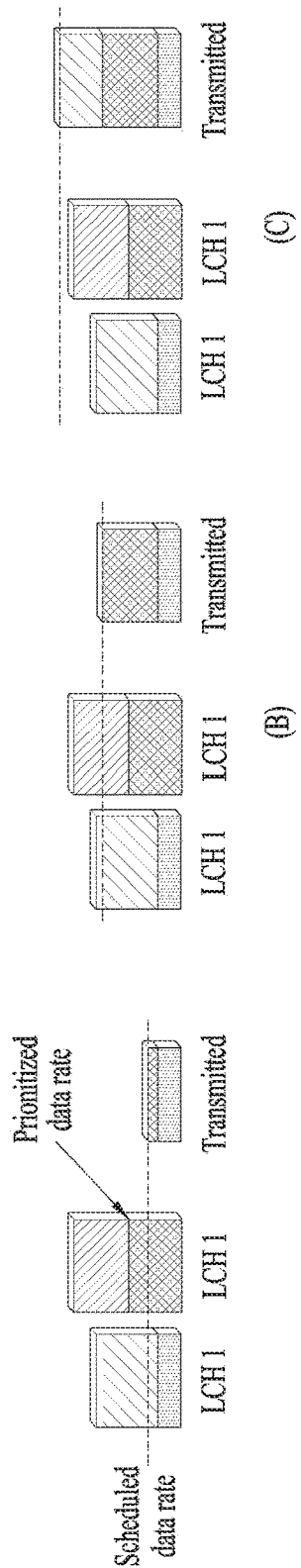
FIG. 11 is a diagram for signaling of buffer status and power-headroom reports.

FIG. 11 is a diagram for signaling of buffer status and power-headroom reports.

The scheduler needs knowledge about an amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inland MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 11.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

Data Available for Transmission in a PDCP Entity

For the purpose of MAC buffer status reporting, the UE shall consider PDCP Control PDUs, as well as the following as data available for transmission in the PDCP entity:

For SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE shall also consider the following as data available for transmission in the PDCP entity:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

Data Available for Transmission in a RLC Entity

For the purpose of MAC buffer status reporting, the UE shall consider the following as data available for transmission in the entity: i) RLC SDUs, or segments thereof, that have not yet been included in an RLC data PDU, ii) RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

In conclusion, 'Data available for transmission' is defined in PDCP and RLC layers to be used for Buffer Status Reporting, Logical Channel Prioritization, and Random Access Preamble Group selection in MAC layer.

Figure 12:
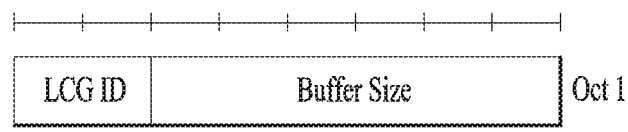
FIG. 12 is a diagram for short BSR MAC CE.
Figure 13:
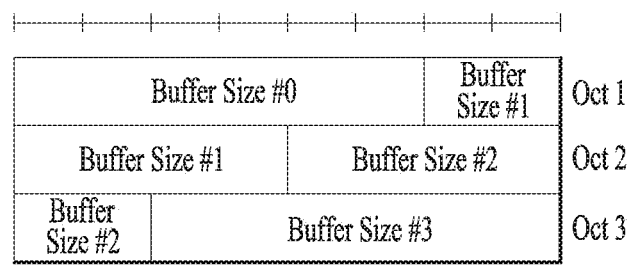
FIG. 13 is a diagram for long BSR MAC CE.

FIG. 12 is a diagram for short BSR MAC CE, and FIG. 13 is a diagram for long BSR MAC CE.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Buffer Status Report (BSR) MAC control elements consist of either: i) Short BSR and Truncated BSR format: one LCG ID field and one corresponding Buffer Size field (FIG. 12) or ii) Long BSR format: four Buffer Size fields, corresponding to LCG IDs #0 through #3 (FIG. 13).

The BSR formats are identified by MAC PDU subheaders with LCIDs as specified in Table 1.

TABLE 1

| Index | LCID values |
| --- | --- |
| 00000 | CCCH |
| 00001-01010 | Identity of the logical channel |
| 01011-10110 | Reserved |
| 10111 | ProSe Truncated BSR |
| 11000 | ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission. The size of the RLC and MAC headers are not considered in the buffer size computation. The length of this field is 6 bits. If extendedBSR-Sizes is not configured, the values taken by the Buffer Size field are shown in Table 2. If extendedBSR-Sizes is configured, the values taken by the Buffer Size field are shown in Table 3.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Figure 14A:
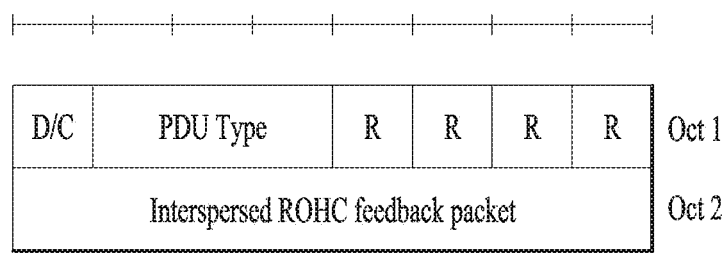
FIGS. 14A to 14C are PDCP control PDU format for PDCP status report.
Figure 14B:
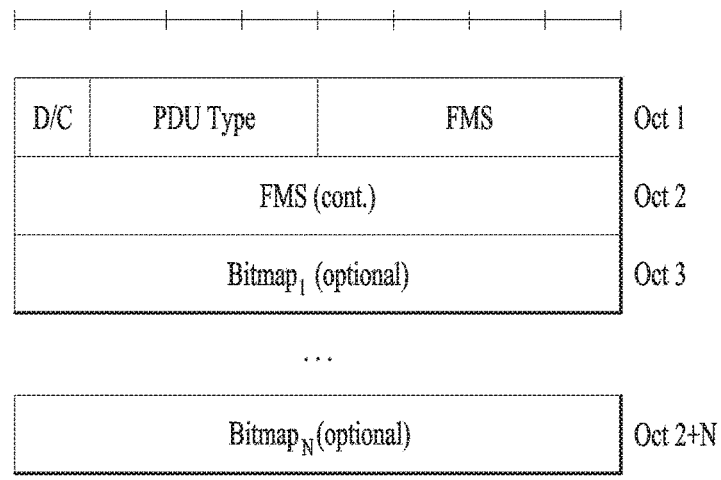
Figure 14C:
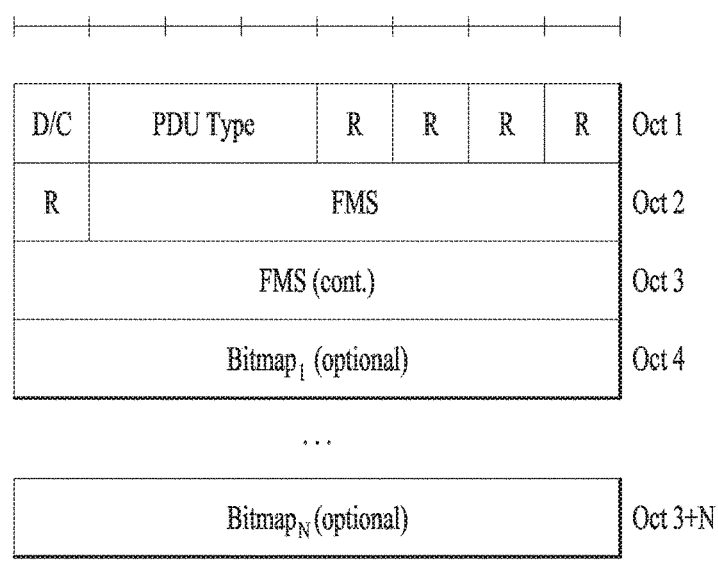

FIGS. 14A to 14C are PDCP control PDU format for PDCP status report.

When upper layers request a PDCP re-establishment, for radio bearers that are mapped on RLC AM, if the radio bearer is configured by upper layers to send a PDCP status report in the uplink, the UE may compile a status report as indicated below after processing the PDCP Data PDUs that are received from lower layers due to the re-establishment of the lower layers, and submit it to lower layers as the first PDCP PDU for the transmission, by: i) setting the FMS field to the PDCP SN of the first missing PDCP SDU; ii) if there is at least one out-of-sequence PDCP SDU stored, allocating a Bitmap field of length in bits equal to the number of PDCP SNs from and not including the first missing PDCP SDU up to and including the last out-of-sequence PDCP SDUs, rounded up to the next multiple of 8; iii) setting as '0' in the corresponding position in the bitmap field for all PDCP SDUs that have not been received as indicated by lower layers, and optionally PDCP SDUs for which decompression have failed; iv) indicating in the bitmap field as '1' for all other PDCP SDUs.

When a PDCP status report is received in the downlink, for radio bearers that are mapped on RLC AM, for each PDCP SDU, if any, with the bit in the bitmap set to '1', or with the associated COUNT value less than the COUNT value of the PDCP SDU identified by the FMS field, the successful delivery of the corresponding PDCP SDU is confirmed, and the UE shall process the PDCP SDU.

The PDCP Control PDU is used to convey a PDCP status report indicating which PDCP SDUs are missing and which are not following a PDCP re-establishment, and header compression control information, e.g. interspersed ROHC feedback.

FIG. 14A is a diagram for PDCP Control PDU format for interspersed ROHC feedback packet. FIG. 14A shows the format of the PDCP Control PDU carrying one interspersed ROHC feedback packet. This format is applicable for DRBs mapped on RLC AM or RLC UM.

FIGS. 14B and 14C is diagrams for PDCP Control PDU format for PDCP status report using a 12 bit SN. FIG. 14B shows the format of the PDCP Control PDU carrying one PDCP status report when a 12 bit SN length is used, and FIG. 14C shows the format of the PDCP Control PDU carrying one PDCP status report when a 15 bit SN length is used. This format is applicable for DRBs mapped on RLC AM.

In the prior art, as there is one scheduling eNB for one UE, there are only one PDCP entity and one RLC entity for one direction (i.e., uplink or downlink) for one radio bearer. Thus, when the UE calculates 'data available for transmission', it just sums up the data available for transmission in PDCP and that in RLC.

In dual connectivity, for one UE, there are two different eNBs that are connected via non-ideal backhaul X2. For split bearer, two RLC entities (one RLC for MeNB and the other RLC for SeNB) and one PDCP entity are used as shown in FIG. 9.

For the split bearer, if the UE wants to transmit data to 'both of the eNBs', the UE should request uplink resource to both eNBs. Then, the question is, in BSR operation, how to consider the data in PDCP layer, which is mapped to two RLC entities, for the split bearer.

One alternative is, for split bearer, to divide the amount of data available for transmission in PDCP layer by using a specific ratio. Part of data in PDCP layer is used to calculate the 'data available for transmission in PDCP layer (DATP)' to be reported to MeNB (DATP-M) and another part of data in PDCP is used to calculate the DATP to be reported to SeNB (DATP-S). This approach seems simple but restricts scheduling flexibility.

Another alternative is, for split bearer, to report the amount of data available for transmission in PDCP layer to both of eNBs so that DATP is double reported from UE point of view. This brings resource waste because two eNBs would provide uplink grants for the same DATP in one UE.

In this invention, when the UE is configured with dual connectivity and connected to at least two eNBs, in order to avoid double reporting of 'data available for transmission in PDCP layer (DATP)', the UE does not report DATP to any of the eNBs that the UE is connected to if a PDCP entity is mapped to at least two RLC entities in the same direction.

Figure 15:
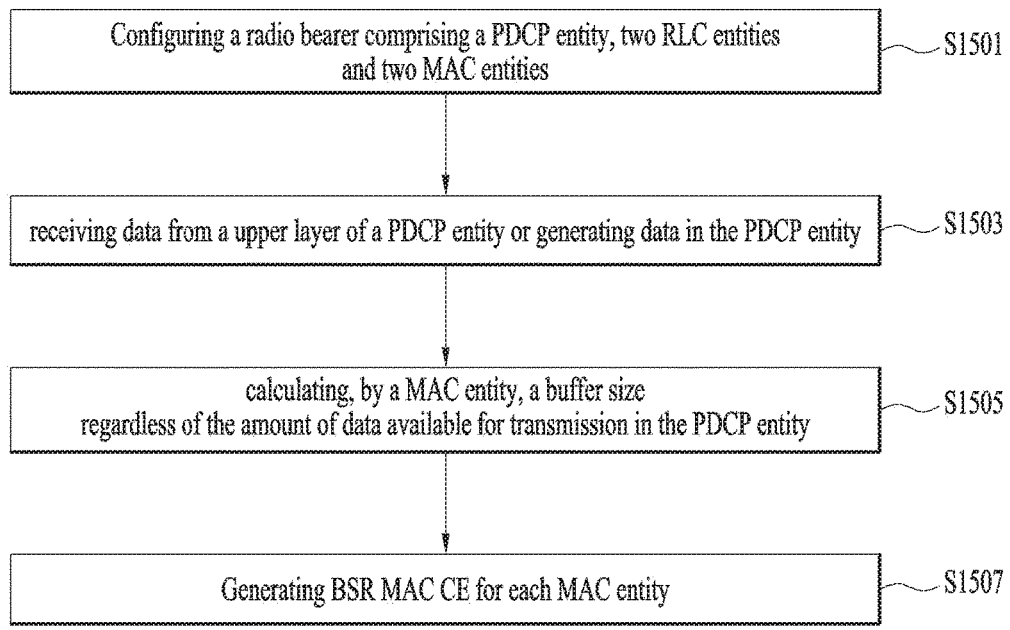
FIGS. 15 and 16 are conceptual diagrams for calculating and reporting an amount available for transmission in a PDCP entity in a dual connectivity system according to embodiments of the present invention.
Figure 16:
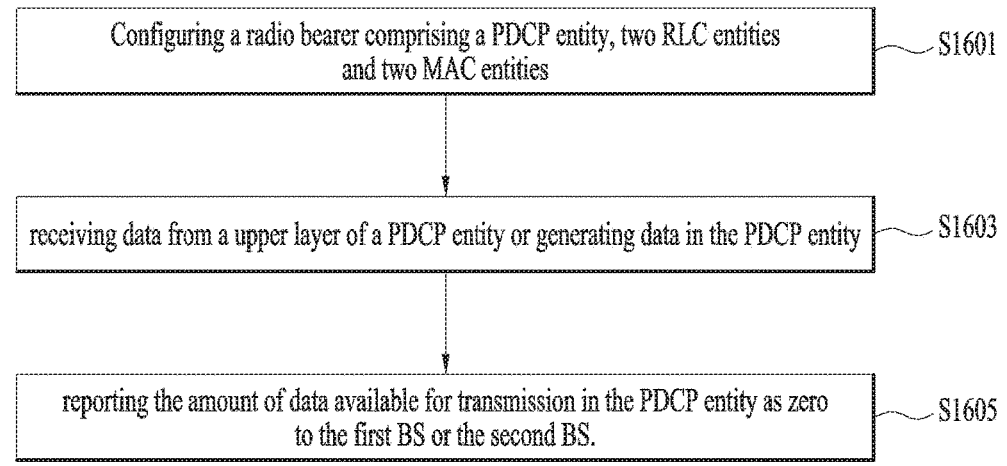

FIGS. 15 and 16 are conceptual diagrams for calculating and reporting an amount available for transmission in a PDCP entity in a dual connectivity system according to embodiments of the present invention.

If the UE configured to a radio bearer comprising a PDCP (Packet Data Convergence Protocol) entity and two RLC (Radio Link Control) entities in the UE, a corresponding peer PDCP entity is located in the MeNB and corresponding peer RLC entities are located in the MeNB and the SeNB respectively.

There are three types of PDCP data considered in 'Data Available for Transmission in PDCP' calculation: i) PDCP SDUs stored in PDCP transmission buffer, ii) PDCP Data PDUs containing PDCP SDUs (not yet submitted to RLC layer), and iii) PDCP Control PDUs containing control information such as interspersed ROHC feedback or PDCP status report generated by PDCP itself.

In case of re-establishment procedure, for SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

For a UE configured with dual connectivity, there are two separate MAC entities in a UE, i.e., one for MeNB and the other one for SeNB.

For a UE configured with dual connectivity, a bearer is mapped to one PDCP entity, two RLC entities, and two MAC entities in the same direction, which is called a split bearer.

Regarding FIG. 15, if a PDCP entity is mapped with two RLC entities and two MAC entities (S1501), one for MeNB and the other for SeNB, the PDCP entity receives data from an upper layer of a PDCP entity or generates data in the PDCP entity (S1503).

The step of S1503 can trigger event for reporting an amount of data available for transmission in the PDCP entity (DATP). The amount of data available for transmission in the PDCP entity comprises data received from the upper layer of a PDCP entity and data generated in the PDCP entity.

The UE generates BSR MAC CE in each MAC entity (S1507), each MAC entity calculates buffer size by including only data that is available for transmission in the RLC entity, i.e., DATP is not included in Buffer Size calculation (S1505).

Preferably, the PDCP entity can indicate that the amount of data available for transmission in the PDCP entity is zero, or the PDCP entity can indicate real amount of data available for transmission in the PDCP entity.

Each MAC entity can ignore DATP reported from PDCP entity, or each MAC entity considers DATP as zero even though the PDCP entity reports non-zero DATP.

In this manner, the DATP may be ignored by only one MAC entity, e.g., MAC entity for SeNB considers data in both of RLC entity and PDCP entity, while MAC entity for MeNB considers only data in RLC entity, or the DATP may be ignored depending on type of BSR, e.g., Padding BSR considers data in both of RLC entity and PDCP entity, while Regular BSR and Periodic BSR consider only data in RLC entity.

For other MAC operation procedure such as Random Access Preambles group selection, LCP, and SR, each MAC entity may consider DATP as reported from PDCP entity.

From this invention, a definition of the buffer size can be changed as follow: the buffer size field identifies the total amount of data available across all logical channels of a logical channel group after all MAC PDUs for the TTI have been built. The amount of data is indicated in number of bytes. For non-split bearer, it shall include all data that is available for transmission in the RLC layer and in the PDCP layer; for split bearer, it shall include all data that is available for transmission in the RLC layer. The size of the RLC and MAC headers are not considered in the buffer size computation. The length of this field is 6 bits.

Regarding FIG. 16, if a PDCP entity is mapped with two RLC entities and two MAC entities (S1601), one for MeNB and the other for SeNB, the PDCP entity receives data from a upper layer of a PDCP entity or generates data in the PDCP entity (S1603).

The step of S1603 can trigger event for reporting an amount of data available for transmission in the PDCP entity (DATP). The amount of data available for transmission in the PDCP entity comprises data received from the upper layer of a PDCP entity and data generated in the PDCP entity.

The UE reports DATP as zero to both of MAC entities mapped to the RLC entities (S1605).

For example, PDCP entity sets DATP to zero regardless of actual DATP or, PDCP entity reports to both of MAC entities that DATP is zero regardless of actual DATP.

In this manner, the PDCP entity may report zero DATP to only one of MAC entities, e.g., PDCP entity reports zero DATP to MAC entity for MeNB, while reports actual DATP to MAC entity for SeNB, or the PDCP entity may report zero DATP to MAC entity only for the purpose of BSR operation. For other purpose such as Random Access Preambles group selection, LCP, and SR, PDCP entity reports actual DATP to MAC entity, or the PDCP entity may report zero DATP to MAC entity in procedures other than PDCP re-establishment procedure. In PDCP re-establishment procedure, PDCP entity reports actual DATP to MAC entity.

For split bearer, the UE shall consider data available for transmission in PDCP layer as zero.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for operating at a User Equipment (UE) communicating with both a first base station (BS) and a second BS in a wireless communication system, the method comprising:

determining, by a Packet Data Convergence Protocol (PDCP) entity, that an amount of data available for transmission in the PDCP entity to the first base station and the second base station is non-zero;

triggering an event for reporting the amount of data available for transmission in the PDCP entity, the PDCP entity being mapped to two Radio Link Control (RLC) entities and two Medium Access Control (MAC) entities; and reporting the amount of data available for transmission in the PDCP entity as zero to the first BS and the second BS, while reporting an amount of data available for transmission in a RLC entity to the first BS and the second BS.

2. The method of claim 1, wherein the triggering the event comprises at least one of:

receiving data from an upper layer of a PDCP entity; and generating data in the PDCP entity.

3. The method of claim 1, wherein the amount of data available for transmission in the PDCP entity comprises:
data received from the upper layer of a PDCP entity; and
data generated in the PDCP entity.

4. The method of claim 1, further comprising indicating, by the PDCP entity to each MAC entity, that the amount of data available for transmission in the PDCP entity is zero.

5. The method of claim 1, further comprising calculating, by a MAC entity, a buffer size, without considering the amount of data available for transmission in the PDCP entity, when the BSR MAC CE is generated for the MAC entity.

6. A User Equipment (UE) communicating with both a first base station (BS) and a second BS for operating in a wireless communication system, the UE comprising:
a radio frequency (RF) module; and
a processor configured to:
control the RF module,
determine that an amount of data available for transmission in a Packet Data Convergence Protocol (PDCP) entity to the first base station and the second base station is non-zero;
trigger an event for reporting the amount of data available for transmission in the PDCP entity, the PDCP entity being mapped to two Radio Link Control (RLC) entities and two Medium Access Control (MAC) entities; and
report the amount of data available for transmission in the PDCP entity as zero to the first BS and the second BS, while reporting an amount of data available for transmission in a RLC entity to the first BS and the second BS.

7. The UE of claim 6, wherein the triggering the event comprises at least one of:
receiving data from an upper layer of a PDCP entity; and
generating data in the PDCP entity.

8. The UE of claim 6, wherein the amount of data available for transmission in the PDCP entity comprises:
data received from the upper layer of a PDCP entity; and
data generated in the PDCP entity.

9. The UE of claim 6, wherein the processor is further configured to indicate that the amount of data available for transmission in the PDCP entity to each MAC entity is zero.

10. The UE of claim 6, wherein the processor is further configured to calculate, by a MAC entity, a buffer size, without considering the amount of data available for transmission in the PDCP entity, when the BSR MAC CE is generated for the MAC entity.

* * * * *